United States Patent Office 3,275,674
Patented Sept. 27, 1966

3,275,674
PROCESS FOR THE MANUFACTURE OF CARBONIC ACID ESTERS
Ludwig Bottenbruch, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Aug. 1, 1960, Ser. No. 46,360
Claims priority, application Germany, Dec. 4, 1956, F 21,284
7 Claims. (Cl. 260—463)

This is a continuation-in-part application to our copending application Serial No. 700,551, filed December 4, 1957 and now abandoned.

A known process for the manufacture of monocarbonic acid diesters consists in reacting one mol of an aliphatic, cycloaliphatic or aromatic monohydroxy compound with half a mol of phosgene or with one mol of a chlorocarbonic acid ester of such a hydroxy compound in an aqueous alkaline solution or suspension, in the presence, if desired, of an inert organic solvent.

Principally in the same manner there may be produced polycarbonates by reacting organic polyhydroxy compounds with chlorocarbonic esters of monohydroxy compounds in a ratio that at most 1 mol of chlorocarbonic acid ester corresponds to 1 hydoxyl group of said polyhdroxy compounds or by reacting polychlorocarbonic acid esters of polyhydroxy compounds with monohydroxy compounds in a ratio that at least 1 monohydroxy compound corresponds to 1 chlorocarbonic acid ester group of said polychlorocarbonic acid ester compounds. Thus one mol of a dihydroxy compound, for instance, a glycol, or resorcinol, hydroquinone etc., may be reacted with 1 mol or 2 mols chlorocarbonic acid ester of a monohydroxy compound, for instance of methanol, ethanol, phenol etc., or 1 mol of trihydroxy compound, for instance glyceral, trimethylol ethane, propane, butane, etc., with 1, 2 or 3 mols monohydroxy compounds, or 1 mol of a tetrahydroxy compound, for instance, pentaerythritol, of a pentahydric alcohol, for instance xylose, or of a hexahydric alcohol, for instance sorbitol, with 1, 2, 3, 4, 5 or 6 mols chlorocarbonic acid ester of a monohydroxy compound respectively, etc., or 1 mol of a bis-chlorocarbonic acid ester of a dihydroxy compound, for instance of a glycol, or of resorcinol, hydroquinone etc., may be reacted with 2 mols monohydroxy compound, for instance an alkanol or a monohydric phenol, or 1 mol of a tris- or of a tetra- or a of a penta- or of hexachlorocarbonic acid ester of a tetra-, penta-, or hexahydric alcohol with 4 or 5 or 6 mols monohydroxy compound respectively. In all these cases there are obtained monomeric carbonates.

In the U.S. application Ser. No. 557,256, filed January 4, 1956, there is described that the process for producing polymeric, high molecular weight polycarbonates by reacting dihydroxy-diphenyl alkanes with substantially equivalent amounts of phosgene or bis-chlorocarbonic acid esters of dihydroxy-di-phenyl alkanes in aqueous alkaline solution or suspension, optionally in the presence of an inert organic solvent, is catalysed by adding small amounts of tertiary amines or salts thereof.

It has now been found that the reaction of hydroxy compounds with the aforesaid chlorine derivatives of carbonic acid under the above-mentioned conditions also for the production of monomeric carbonic acid esters as mentioned above may be markedly accelerated in the presence of small quantities of tertiary amines, such as trimethylamine, triethylamine, tripropylamine, tributylamine, N,N-dimethylcyclohexylamine, N,N-diethylcyclohexylamine, N,N-dimethylaniline, N,N-diethylaniline, pyridine, picoline, methylpyridine, quinoline.

Amounts of 0.005 to 1 percent by weight of an amine mentioned above referred to the quantity of hydroxy compound employed are generally sufficient. Greater amounts do not injure but, as a rule, are avoided for economical reasons. The amines or their salts may be added to the reaction mixture before or during the reaction.

Therefore the subject of the present invention is an improvement of the process for the manufacture of monomeric carbonic acid esters by reacting organic hydroxy compounds with phosgene or with chlorocarbonic acid esters of organic hydroxy compounds in the meaning mentioned above, according to which the speed of the reaction is increased and which comprises carrying out the reaction in the presence of a tertiary amine.

Principally all organic mono- and polyhydroxy compounds or their chlorocarbonic esters respectively may be used for this process, that is to say all aliphatic, cycloaliphatic, araliphatic, aromatic, alkaromatic and heterocyclic hydroxy compounds. Under the very great number of such hydroxy compounds there may be mentioned as typical representatives thereof:

Methanol, ethanol, propanol, isopropanol, butanol, isobutanol, the amyl alcohols, the hexanols, the heptanols, the octanols, the dodecanols, stearyl alcohol, allyl alcohol, methallyl alcohol, etc., ethylene and polyethylene glycol monomethyl, ethyl, propyl, butyl, allyl, benzyl and phenyl ethers, the corresponding monoethers of propanediol, butanediol, pentanediol, etc., the corresponding diethers of glycerol, trimethylol ethane, propane, butane, etc., the corresponding triethers of pentaerythritol, ethylene- and polyethylene glycol monoformate, acetate, propionate, butyrate, palmitate, methacrylate, benzoate, etc., the corresponding ethers and esters of thiodiglycol, the corresponding monoesters of propanediol, butanediol etc., the corresponding diesters of glycerol, trimethylol ethane, propane etc., the corresponding triesters of pentaerythritol etc., glycolic and lactic acid methyl, ethyl, propyl, isopropyl, butyl, isobutyl, amyl, allyl, benzyl, and phenyl ester, salicylic acid methyl, ethyl, benzyl, phenyl esters etc., hydroxy acetophenone, furfuryl alcohol, 2,5-thiotenol and thioindoxyl, cyclopentanol, -hexanol, -heptanol, Benzyl alcohol, α-phenylethanol, hydroxy ethoxy and propoxy benzene, hydroxy, ethoxy and propoxy toluenes, xylenes etc., phenols, the naphthols, hydroxy anthracenes, fluoro-, chloro-, bromo- and iodo-phenols and naphthols, nitrophenols, the cresols, the xylenols, thymol, α-methyl-β-naphthol, higher alkyl phenols, such as the isopropyl phenols, the tert.butyl phenols, the cyclohexyl phenols, the dodecyl phenols, ar-tetrahydro-α-naphthol, o-methoxy- and -ethoxy phenols, resorcinol and hydroquinone monomethyl and -ethyl ether, Ethylene and polyethylene glycols, propylene and polypropylene glycols, thiodiglycol, bis-hydroxy ethoxy and propoxy butane, butane-1,3 and 1,4-diol, the pentane-, hexane-, heptane diols etc., glyceral-, trimethylol ethane, propane etc., monomethyl, ethyl, propyl, isopropyl etc. esters, pentaerythritol dimethyl, diethyl, dipropyl, di-isopropyl etc. ethers, glycerol and trimethylol ethane, propane etc. monoformate, monoacetate, monopropionate, monobutyrate, monomethacrylate, monobenzoate, etc., and the corresponding diesters of pentaerythritol, terephthalic acid bi-glycol ester, ethylene glycol bis-lactic acid ester, quinite, 2,2-bis-(p-hydroxy-cyclohexyl)-propane, Dihydroxy-dimethyl and diethyl benzenes, dihydroxy-dimethyl biphenyl, dihydroxy ethoxy and propoxy benzenes, -bi-phenyl, and -diphenyl alkanes, -cyclo-alkanes, -oxide, -ketone, -sulphide, -sulphone, -sulphoxide, Hydroquinone, resorcinol, pyrocatechol, bi-phenol, dihydroxy diphenyl alkanes and cycloalkanes, oxides, ketone, sulphide, sulphone and sulphoxide, dihydroxy naphthalenes, dihydroxy anthracenes, dihydroxy anthraquinones, tetrachlorohydroquinone, tetranitro-biphenol, (dihydroxy-tetrachloro-diphenyl)-alkanes and -cycloalkanes, dihydroxy dicyclohexyl-biphenyl, bis-(p-hydroxybenzoic acid)-glycol ester, ethylene glycol bis-(hydroxyphenyl ethers), phloroglucinol monomethyl, monoethyl, monopropyl etc. ether, monoformate, monoacetate, monopropionate, monobenzoate etc., Glycerol, trimethylol ethane, propane, butane, trimethylol phenyl methane, 3,3-dimethylol butanol-2, 2,2-dimethylol-1-phenyl propanol, trihydroxy-triphenyl-ethane, phloroglucinol, trisphenol, trihydroxy-anthraquinones, pentaerythritol, tetrahydroxy-anthraquinones, xylitol and sorbitol and so on.

It may be understood that said hydroxy compounds are only a little part of the great number of hydroxy compounds which are suitable for the present invention according to which there may be produced monomeric mono- and polycarbonates, and that said hydroxy compounds do not limit the invention.

Some few of such carbonates may be mentioned as examples: diethyl, dibutyl, diallyl, diphenyl, di-p-tert. butyl phenyl and di-α-naphthyl carbonate, the mixed bis-carbonates of methanol, ethanol, butanol, allyl alcohol, phenol, p-tert.butyl phenol and α-naphthyl phenol, and of resorcinol, hydroquinone, biphenol, tetrachlorohydroquinone, tetrachloro-biphenol, 2,2-(4,4'-dihydroxy-diphenyl)-alkanes and -cycloalkanes, for instance, -propane and -cyclohexane, of 2,2-(3,3',5,5'-tetrachloro-4,4'-dihydroxy-diphenyl)-propane, furthermore the triscarbonate of phenol and phloroglucinol, or of allyl alcohol and glycerol, and so on.

The condensation may be effected within a short reaction time at or below room temperature. But it is also possible to carry out the reaction at elevated temperatures up to about 100° C. The requisite excess of phosgene, if used, is very small. The carbonic acid esters thus obtained contain less chlorocarbonic acid ester than those produced without the use of amines or their salts in comparable reaction times.

The reaction products of the process according to the invention as well known in the art and may be used for known purposes, that is particularly as intermediate products for organic synthesis, for example, as reaction component for interesterifying reactions. An important use for carbonic acid diesters is, for instance, the use as starting material for the production of high molecular weight, linear polycarbonates by interesterifying said diesters with dihydroxy compounds at elevated temperature, for instance, according to the processes described in U.S. application Serial Numbers 557,256, filed January 4, 1956, 572,802, filed March 21, 1956 and now U.S. Patent No. 3,136,741, 572,793, filed March 21, 1956, 583,382, filed May 8, 1956, and now U.S. Patent No. 2,997,459, 614,340, filed October 8, 1956 and now U.S. Patent No. 3,022,272, 596,398, filed July 9, 1956 and now U.S. Patent No. 2,946,766, and 688,822, filed October 8, 1957.

The following examples are given for the purpose of illustrating the invention.

*Example 1*

Into a mixture of 94 parts by weight by phenol, 40 parts by weight of caustic sodo, 500 parts of water and 300 parts of benzene, a solution of 49.5 parts by weight of phosgene in 100 parts of benzene is slowly dropped within 35 minutes at 20° C. During the reaction the pH-value of the mixture is held constant at about 11.7 by dropping further 6.5 parts of a 2 N caustic soda solution into the mixture. At the end of the reaction the mixture smells highly of chlorocarbonic acid phenyl ester. The benzene layer is separated, washed one time with 1 N caustic soda solution, one time with water, one time with diluted hydrochloric acid and then further with water until neutral and finally dried over sodium sulphate. After distilling off the benzene there remains 107 grams of a yellowish syrup which crystallizes after standing for some time. The product which should be diphenyl carbonate (melting point of the pure product 78–79° C.) has a melting point of 58–62° C. and contains 2.1 percent of organically bound chlorine which corresponds to 9.2 percent of chlorocarbonic acid phenyl ester.

A parallel run is carried out as described above, but 2 grams of triethylamine are added to the reaction mixture at the beginning of the reaction. For holding the pH-value of the mixture of 11.7, 8.3 parts of a 2 N caustic soda solution are dropped into the mixture. At the end of the reaction there is no smell of a chlorocarbonic acid phenyl ester. While distilling off the benzene 112 grams of diphenyl carbonate crystallize. The melting point of the product is 74–76° C. The product contains only 0.02 percent of organically bound chlorine.

*Example 2*

To a solution of 150 parts by weight of p-tert.butyl phenol (1 mol) and 45 parts by weight of sodium hydroxide (1.12 mol) in 543 parts by weight of water, a solution of 49.5 grams of phosgene (0.5 mol) in 200 parts by weight of toluene is added dropwise at about 0° C., within 15 minutes. To follow the reaction, samples are withdrawn from time to time and the amounts of ionic chlorine contained in the samples are determined as follows:

| | Grams chlorine per litre |
|---|---|
| When dropwise addition of the phosgene solution is completed | 45.8 |
| After an additional 10 minutes | 47.9 |
| After an additional 20 minutes | 50.3 |
| After an additional 60 minutes | 58.6 |

Yield: 170 grams, i.e., 96 percent of the theoretical.

A control test with the addition of 0.5 part by weight of triethylamine according to the invention gives the following results:

| | Grams chlorine per litre |
|---|---|
| When dropwise addition of the phosgene solution is completed | 55.3 |
| After an additional 10 minutes | 58.6 |

Yield: 168 grams, i.e., 95 percent of the theoretical.

*Example 3*

Into a mixture of 114 parts by weight of 2,2-bis-(4-hydroxyphenyl)-propane (0.5 mol), 89 parts by weight of 45 percent caustic soda solution (0.5 mol), 400 parts of water and 200 parts of benzene there are dropped under stirring at 20° C. within 34 minutes 156.5 parts by weight of chlorocarbonic acid phenyl ester. During the reaction the pH-value of the reaction mixture is held constant at 11.8 by slowly dropping further 3.75 parts by weight of the 45 percent caustic soda solution. At the end of the reaction the benzene layer is separated, washed one time with 1 N caustic soda solution, two times with water, one time with diluted hydrochloric acid and finally once more with water until neutral and then dried over sodium sulphate. After distilling off the benzene there remain 204 grams of a tough, sticky, yellowish syrup which crystallizes after some time. (Melting point 68–70°.)

The reaction product 2,2-bis-(4-phenylcarbonate)-phenylpropane contains 1.3 percent of organically bound chlorine corresponding to 5.7 percent of unreacted chlorocarbonic acid phenyl ester.

Another run is carried out as described above, but according to the invention 2 parts by weight of triethylamine are added to the reaction mixture when beginning the reaction. After working up there remain 208 parts by weight of a white crystalline product (melting point 92–96° C.). (The melting point of the pure 2,2-bis-(4-phenylcarbonate)-phenyl-propane is 100–102° C.) The product contains only 0.07 percent of organically bound chlorine.

Example 4

(a) To a mixture of 108 grams p-cresol, 97.9 grams 45 percent aqueous caustic soda solution, 400 grams water and 180 grams benzene there are added at a temperature of 20° C. under stirring within 24 minutes 191 grams of the bischlorocarbonic acid ester of oxypropylated butanediol-1,3 (1 mol butanediol-1,3+3 mols porpylene oxide. After the addition of the total amount of the bischlorocarbonic acid ester samples of the organic solution are taken at certain intervals for detecting the content of saponifiable chlorine. The dates of the analyses are stated in Table I.

(b) In a second run according to the invention 1.27 grams dimethylcyclohexylamine are added to the reaction mixture before the addition of the bischlorocarbonic acid ester. Samples of the organic solution are also taken as described under (a). The dates of these samples are listed in Table I. The organic solution of the formed carbonic acid ester is washed with diluted aqueous caustic soda solution and with water. After evaporating the solvent there remained a viscous yellowish oil with a refraction index of $n_D^{20}$ 1.4950.

Saponification number: 425,
Yield (samples included): 239 grams=92 percent of the theory.

TABLE I

| Minutes after the addition of the chlorocarbonic acid ester when the samples are taken | Percent saponifiable chlorine content | |
|---|---|---|
| | IVa | IVb |
| 0 | 3.92 | 1.55 |
| 5 | 3.15 | |
| 10 | 2.63 | 0.43 |
| 15 | 2.33 | 0.09 |
| 20 | 1.76 | 0.10 |
| 25 | 1.80 | 0.08 |
| 30 | 1.73 | (1) |
| 35 | 1.71 | (1) |

[1] Not detectable.

Example 5

(a) To a mixture of 114 grams bisphenol A, 97.9 grams 45 percent aqueous caustic soda solution, 400 grams water and 200 grams benzene, there are added 192.5 grams 2-ethylhexanol-chlorocarbonic acid ester at 20° C. within 6 minutes under stirring. When the addition is completed samples of the organic layer are taken in certain intervals for detecting the content of saponifiable chlorine. The dates are listed in Table II.

(b) In a second run according to the invention 1.01 grams triethylamine are added to the reaction mixture before dropping in the chlorocarbonic acid ester. Samples of the organic solution are also taken as described under (a). The dates of these samples are listed in Table II. The organic solution of the formed carbonic acid ester is washed with daluted aqueous caustic soda solution and with water. After evaporation the solvent there remained a viscous colourless oil with the refraction index of $n_D^{20}$ 1.5043.

Saponification number: 410,
Yield (samples include): 249 grams=92 percent of the theory.

TABLE II

| Minutes after the addition of the chlorocarbonic acid ester when the samples are taken | Percent saponifiable chlorine content | |
|---|---|---|
| | IVa | IVb |
| 0 | 10.43 | 7.87 |
| 5 | 8.92 | 7.08 |
| 10 | 8.76 | 6.13 |
| 15 | 8.68 | 5.51 |
| 20 | | 3.74 |
| 25 | | 1.79 |
| 30 | | 0.55 |
| 45 | | (1) |
| 60 | 8.24 | (1) |

[1] Not detectable.

Example 6

(a) Into a mixture of 108 grams p-cresol, 97.9 grams 45 percent aqueous caustic soda solution, 400 grams water and 200 grams benzene there are dropped, 192.5 grams 2-ethylhexanol-chlorocarbonic acid ester under stirring at 20° C. within 10 minutes. After the addition of the total amount of the chlorocarbonic acid ester samples of the organic layer are taken for detecting the saponifiable chlorine content. The chlorine values found in these samples are listed in Table III.

(b) In a second run according to the invention 1.85 grams tributylamine are added to the reaction mixture before dropping in the chlorocarbonic acid ester. Samples of the organic layer are also taken as described under (a). The chlorine found in these samples is listed in Table III. The organic solution of the formed carbonic acid ester was washed with diluted aqueous caustic soda solution and with water. After evaporation of the solvent there remained a viscous colourless oil with a refraction index of $n_D^{20}$ 1.4802.

Saponification number: 487,
Yield (samples included): 237 grams=89 percent of the theory.

TABLE III

| Minutes after the addition of the chlorocarbonic acid ester when the samples are taken | Percent saponifiable chlorine content | |
|---|---|---|
| | IVa | IVb |
| 0 | 9.08 | 0.47 |
| 5 | 8.66 | 0.03 |
| 10 | | 0.02 |
| 15 | | 0.02 |
| 20 | | |
| 25 | | 0.02 |
| 30 | 7.46 | (1) |
| 45 | | (1) |
| 60 | 6.01 | (1) |

[1] Not detectable.

We claim:

1. In a process for the manufacture of monomeric carbonic acid esters by reacting organic hydroxy compounds with a carbonic acid derivative selected from the group consisting of phosgene and chlorocarbonic acid esters of organic hydroxy compounds in an aqueous alkaline solution, the improvement comprising increasing the speed of the reaction by employing as a catalyst in said reaction about 0.005–1% by weight, based on the weight of said hydroxy compounds, of a tertiary amine selected from the group consisting of trimethylamine, triethylamine, tripropylamine, tributylamine, N,N - dimethylcyclohexylamine, N,N-diethylcyclohexylamine, N,N-dimethylaniline, N,N-diethylaniline, pyridine, picoline, methylpyridine and quinoline at temperatures from about 0° C. to about 100° C., said organic hydroxy compounds being selected from the group consisting of saturated and unsaturated unsubstituted alcohols, saturated and unsaturated phenyl-substituted alcohols, unsubstituted partially esterified and partially etherified polyhydric alcohols containing a free hydroxyl group, unsubstituted monohydric phenols and naphthols, unsubstituted polyhydric phenols, monohydric phenols and naphthols which are substituted by a member selected from the group consisting of alkyl, cycloalkyl, halogen and nitro substituents, and unsubstituted partially esterified and etherified polyhydric phenols containing a free hydroxyl group, whereby said monomeric carbonic acid ester is obtained in improved yield and with a higher purity.

2. The process of claim 1 wherein the catalyst is triethylamine.

3. A process for the manufacture of a monomeric carbonic acid ester which comprises reacting phenol, which is dissolved in an aqueous solution of sodium hydroxide, with a benzene solution of phosgene at about room temperature in the presence of a catalytic amount of triethylamine, and recovering the diphenyl carbonate formed in said reaction, said diphenyl carbonate being obtained in improved yield and with a higher purity as a result of employing said triethylamine catalyst.

4. A process for the manufacture of a monomeric carbonic acid ester which comprises reacting p-tertiary butyl phenol, while dissolved in an aqueous solution of sodium hydroxide, with a toluene solution of phosgene in the presence of a catalytic amount of triethylamine, said carbonic acid ester being obtained in improved yield and with a higher purity as a result of employing said triethylamine catalyst.

5. A process for the manufacture of a monomeric carbonic acid ester which comprises reacting 2,2-bis-(4-hydroxyphenyl)-propane, while dissolved in an aqueous alkaline solution of sodium hydroxide, with the phenyl ester of chlorocarbonic acid at about room temperature, and accelerating the speed of said reaction by employing therein a catalytic amount of triethylamine, said carbonic acid ester being obtained in improved yield and with a higher purity as a result of employing said triethylamine catalyst.

6. A process for the manufacture of a monomeric carbonic acid ester which comprises reacting 2,2-bis-(4-hydroxyphenyl)-propane, dissolved in an aqueous alkaline solution, with the chlorocarbonic acid ester of 2-ethylhexanol at about room temperature and in the presence of a catalytic amount of triethylamine, said carbonic acid ester being obtained in improved yield and with a higher purity as a result of employing said triethylamine catalyst.

7. A process for the manufacture of a monomeric carbonic acid ester which comprises reacting p-cresol, dissolved in an aqueous alkaline solution, with the chlorocarbonic acid ester of 2-ethylhexanol at about room temperature and in the presence of a catalytic amount of tributylamine, said carbonic acid ester being obtained in an improved yield and with a higher purity as a result of employing said tributylamine catalyst.

References Cited by the Examiner
UNITED STATES PATENTS

| | | | |
|---|---|---|---|
| 2,370,571 | 2/1945 | Muskat et al. | 260—463 |
| 2,648,697 | 8/1953 | Heilberger | 260—463 |
| 2,808,371 | 10/1957 | Stevens | 260—463 |
| 2,873,291 | 2/1959 | Spiegler | 260—463 |

OTHER REFERENCES

Wagner and Zook, "Synthetic Organic Chemistry," pp. 483–4 (1953).

CHARLES B. PARKER, *Primary Examiner.*

JACOB ZIEGLER, STANLEY H. LIEBERSTEIN, FLOYD D. HIGEL, *Assistant Examiners.*